G. E. COLE.
HUB.
APPLICATION FILED AUG. 10, 1916.
1,278,595. Patented Sept. 10, 1918.
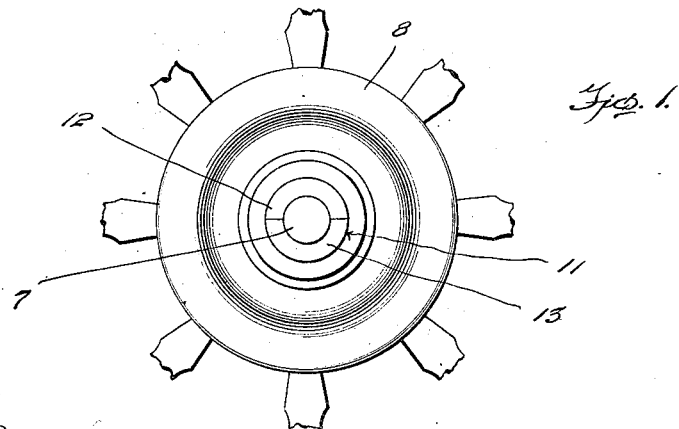
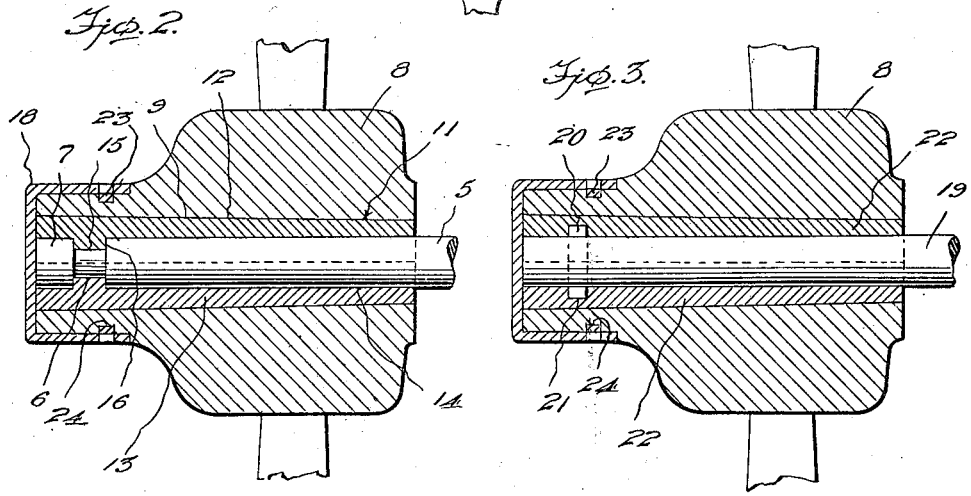
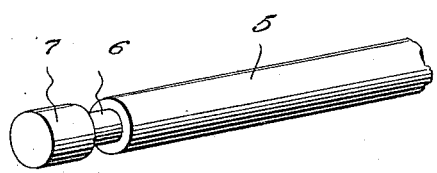
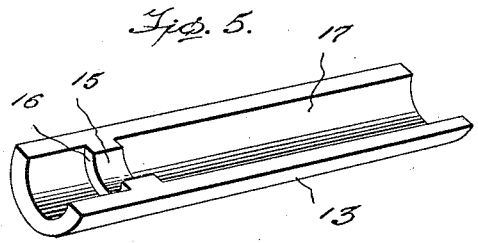
Inventor
George E. Cole.
Witness
By John Louis Waters & Co.
Attorney

UNITED STATES PATENT OFFICE.

GEORGE ELMER COLE, OF SOUTH BEND, INDIANA.

HUB.

1,278,595.

Specification of Letters Patent.   Patented Sept. 10, 1918.

Application filed August 10, 1916.   Serial No. 114,209.

*To all whom it may concern:*

Be it known that I, GEORGE E. COLE, a citizen of the United States, residing at South Bend, in the county of St. Joseph and State of Indiana, have invented certain useful Improvements in Hubs, of which the following is a specification, reference being had therein to the accompanying drawing.

This invention relates to improvements in hubs, one object of the invention being the provision of a wheel hub for use upon wagons and other vehicles which is provided with means for coöperating with the axle for holding the hub upon the axle without the use of nuts and caps as is the usual practice.

A further object of this invention is the provision of a novel arrangement of hub and axle construction which is simple, durable and inexpensive in construction, and thoroughly efficient and practical in use.

In the accompanying drawings:

Figure 1 is a front elevation of the hub with the cap removed, said hub being constructed according to and embodying the present invention.

Fig. 2 is a section taken on line 2—2 thereof, the hub cap being shown.

Fig. 3 is a sectional view of a modified construction.

Figs. 4 and 5 are detail perspective views of the axle and the axle box.

Referring to the drawings, the numeral 5 designates the axle which is provided with the circumferential groove 6 adjacent the outer end thereof to provide the cylindrical head 7.

The hub 8 is provided with the bore 9, which is preferably slightly tapering from the outer to the inner end. The axle box 11 is made of two sections 12 and 13, each section when coöperating and fitting within the bore of the hub, providing a bearing portion 14 for the main portion of the axle. The semicircular rim 15 forms a shoulder 16 adapted to project snugly into the circumferential groove of the axle so as to bear with its shoulder portion against the corresponding shoulders formed on the axle in a plane with said groove. A dust cap 18 fits over the outer end of the hub and thus excludes the entrance of any dust to the parts, the resilient tongue 23 fitting into the groove 24.

In the hub shown in Fig. 3, the axle 19 is provided with the annular projection 20, which fits within the circumferential groove 21 formed in the sectional members 22, this construction acting similar to that heretofore described, but the limiting members being reversed.

From the foregoing description taken in connection with the drawings, it is evident that with a device of this character, the hub is properly secured upon the axle without the use of the usual nuts, and that no limiting disk is necessary upon the inner side of the axle, as this device holds the hub against lateral movement in both directions.

What I claim as new is:—

In combination an axle formed at each end with an annular groove, two axle-box sections each consisting of a semi-cylindrical member formed at one end with a semi-cylindrical internal rib fitting in said groove of the axle, said ribs providing a cylindrical collar surrounding said axle and lying completely within the groove thereof, said axle box being of a gradually increasing diameter toward its ribbed end, a wheel hub having an internal bore of a gradually increasing diameter toward its outer end, the larger end of said axle-box fitting the larger end of the bore of said hub flush with the hub, and a cap having its base portion engaging said axle and axle box, as well as said hub, and being secured only to said hub.

In testimony whereof I affix my signature.

GEORGE ELMER COLE.

Copies of this patent may be obtained for five cents each, by addressing the "Commissioner of Patents, Washington, D. C."